(12) United States Patent
Kim et al.

(10) Patent No.: US 10,355,303 B2
(45) Date of Patent: Jul. 16, 2019

(54) ELECTRODE ASSEMBLY, MANUFACTURING METHOD THEREOF, AND RECHARGEABLE BATTERY

(71) Applicant: SAMSUNG SDI CO., LTD., Yongin-si, Gyeonggi-do (KR)

(72) Inventors: Bo-Hyun Kim, Yongin-si (KR); Yu-Jin Han, Yongin-si (KR); Hye-Jin Kwon, Yongin-si (KR); Eun-Young Goh, Yongin-si (KR); Jun-Won Suh, Yongin-si (KR); Jong-Ki Lee, Yongin-si (KR); Jin-Hyon Lee, Yongin-si (KR); Ji-Woon Lee, Yongin-si (KR); Sung-Yong Kim, Yongin-si (KR); Sang-In Park, Yongin-si (KR); Jin-Seon Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 199 days.

(21) Appl. No.: 15/227,841

(22) Filed: Aug. 3, 2016

(65) Prior Publication Data
US 2017/0062867 A1    Mar. 2, 2017

(30) Foreign Application Priority Data
Aug. 27, 2015 (KR) .......................... 10-2015-0121076

(51) Int. Cl.
*H01M 2/02* (2006.01)
*H01M 2/06* (2006.01)
(Continued)

(52) U.S. Cl.
CPC ..... *H01M 10/0463* (2013.01); *H01M 2/0207* (2013.01); *H01M 2/0275* (2013.01);
(Continued)

(58) Field of Classification Search
CPC ................................................... H01M 4/043
See application file for complete search history.

(56) References Cited

U.S. PATENT DOCUMENTS 7,611,549 B2  11/2009  Haasl
8,945,744 B2  2/2015  Kwon et al.
(Continued)

FOREIGN PATENT DOCUMENTS

EP    2843747 A1    3/2015
EP    2866293 A1    4/2015
(Continued)

OTHER PUBLICATIONS

EPO Extended Search Report dated Oct. 27, 2016, for corresponding European Patent Application No. 16186029.1 (8 pages).
(Continued)

*Primary Examiner* — Matthew J Merkling
(74) *Attorney, Agent, or Firm* — Lewis Roca Rothgerber Christie LLP

(57) ABSTRACT

There is provided a manufacturing method of an electrode assembly, the method including blanking a first electrode from a first base including a first coated region and a first uncoated region, blanking a second electrode from a second base including a second coated region and a second uncoated region, laminating a separator on the second electrode, cutting the laminated second electrode with the separator, and stacking the laminated second electrode and the first electrode.

11 Claims, 16 Drawing Sheets

(51) Int. Cl.
- *H01M 2/26* (2006.01)
- *H01M 2/30* (2006.01)
- *H01M 4/04* (2006.01)
- *H01M 10/04* (2006.01)
- *H01M 10/058* (2010.01)
- *H01M 10/0585* (2010.01)

(52) U.S. Cl.
CPC ............... *H01M 2/06* (2013.01); *H01M 2/26* (2013.01); *H01M 2/30* (2013.01); *H01M 4/043* (2013.01); *H01M 4/0471* (2013.01); *H01M 10/04* (2013.01); *H01M 10/058* (2013.01); *H01M 10/0585* (2013.01)

(56) References Cited

U.S. PATENT DOCUMENTS

| | | |
|---|---|---|
| 2002/0122975 A1 | 9/2002 | Spillman et al. |
| 2010/0175245 A1 | 7/2010 | Do et al. |
| 2011/0250485 A1 | 10/2011 | Tsukuda |
| 2012/0321930 A1* | 12/2012 | Ahn ................. H01M 2/06 429/144 |
| 2012/0321941 A1 | 12/2012 | Kang |
| 2013/0048340 A1 | 2/2013 | Bando et al. |
| 2013/0295436 A1* | 11/2013 | Kwon ............... H01M 2/266 429/159 |
| 2014/0020235 A1* | 1/2014 | Aramaki ........... H01M 2/1673 29/593 |
| 2014/0038032 A1* | 2/2014 | Lee .................. H01M 4/583 429/178 |
| 2014/0050958 A1 | 2/2014 | Kwon et al. |
| 2014/0099525 A1 | 4/2014 | Kwon et al. |
| 2014/0363727 A1* | 12/2014 | Ko .................. H01M 10/0413 429/149 |
| 2014/0373343 A1* | 12/2014 | Park ................. H01M 2/1673 29/623.4 |
| 2015/0026970 A1 | 1/2015 | Jung et al. |
| 2015/0033547 A1* | 2/2015 | Yang ................. H01M 10/04 29/623.4 |
| 2015/0037664 A1 | 2/2015 | Kang et al. |
| 2015/0236337 A1 | 8/2015 | Kim et al. |
| 2015/0349311 A1* | 12/2015 | Sawada ............. H01M 4/139 156/60 |

FOREIGN PATENT DOCUMENTS

| | | |
|---|---|---|
| EP | 3062379 A1 | 8/2016 |
| JP | 2001-357892 A | 12/2001 |
| JP | 2010-529617 A | 8/2010 |
| KR | 10-2012-0139009 | 12/2012 |
| KR | 10-2013-0124622 A | 11/2013 |
| KR | 10-2013-0132231 | 12/2013 |
| KR | 10-2014-0034405 A | 3/2014 |
| KR | 10-2014-0110162 A | 9/2014 |
| KR | 10-2014-0148151 | 12/2014 |
| KR | 10-2015-0037089 | 4/2015 |
| WO | WO 2013/137385 A1 | 9/2013 |
| WO | WO 2015/102221 A1 | 7/2015 |

OTHER PUBLICATIONS

KIPO Office Action dated May 29, 2017, for corresponding Korean Patent Application No. 10-2015-0121076 (9 pages).

European Communication pursuant to Article 94(3) EPC, for Patent Application No. EP 16 186 029.1, dated Mar. 20, 2019, 9 pages.

* cited by examiner

FIG. 5
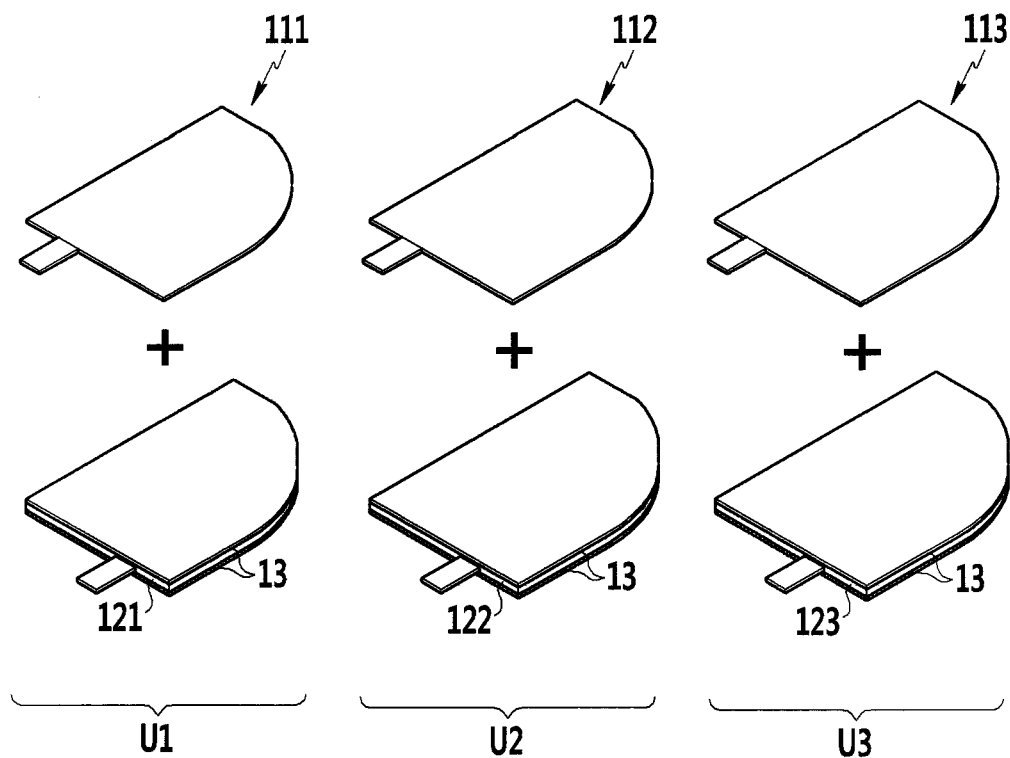
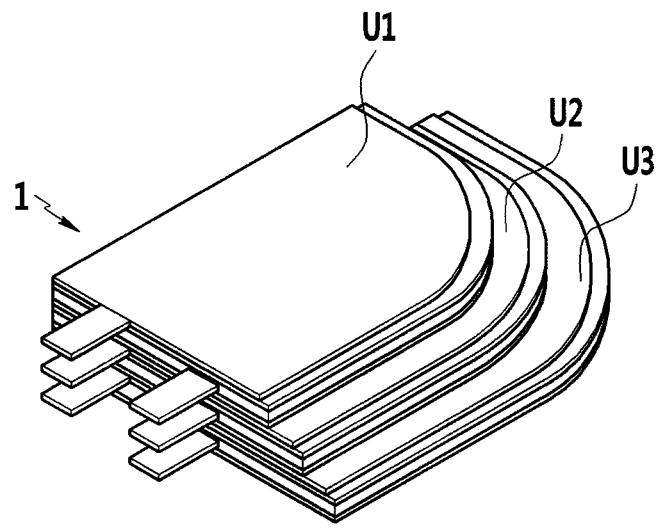

ELECTRODE ASSEMBLY, MANUFACTURING METHOD THEREOF, AND RECHARGEABLE BATTERY

CROSS-REFERENCE TO RELATED APPLICATION

This application claims priority to, and the benefit of, Korean Patent Application No. 10-2015-0121076, filed in the Korean Intellectual Property Office on Aug. 27, 2015, the entire content of which is incorporated herein by reference.

BACKGROUND

1. Field

The described technology relates generally to an electrode assembly, a manufacturing method thereof, and a rechargeable battery.

2. Description of the Related Art

With advancement of technology for mobile devices, demand for rechargeable batteries as energy sources has been increasing. A rechargeable battery differs from a primary battery in that it can be repeatedly charged and discharged, while the latter is incapable of being recharged.

A low-capacity rechargeable battery is used in small portable electronic devices, such as mobile phones, notebook computers, and camcorders, while a high-capacity rechargeable battery can be used as a power source for driving motors of a hybrid vehicle, an electric vehicle, and the like.

For example, a pouch type rechargeable battery includes a stacked-type electrode assembly for performing charging and discharging operations, a pouch for accommodating the electrode assembly and an electrolyte solution, and a lead tab electrically coupled to the electrode assembly and drawn out (e.g., extending out) of the pouch.

Electronic devices use variously sized and shaped rechargeable batteries depending on types, sizes, and inner space shapes thereof. However, because rechargeable batteries are formed in typical shapes, such as a cylindrical or cuboid shape, they may not be effectively and easily applied to the accommodation spaces of electronic devices.

In addition, atypical rechargeable batteries (e.g., rechargeable batteries having atypical shapes) that are easily applied to the accommodation spaces of the electronic devices have difficulties resulting from the fact that it is difficult to stack atypical (e.g., atypically shaped) electrodes and atypical separators and to atypically cut separators.

The above information disclosed in this Background section is to enhance the understanding of the background of the invention, and therefore it may contain information that does not form the prior art.

SUMMARY

Aspects of embodiments of the present invention are directed to an electrode assembly that is applicable to variously sized and shaped accommodation spaces of electronic devices.

Aspects of embodiments of the present invention are directed to an electrode assembly in which an electrode and a separator are cut, such that the cut electrode and separator may be easily assembled.

Further aspects of embodiments of the present invention are directed to a manufacturing method of an electrode assembly, and a rechargeable battery to which an electrode assembly manufactured by the manufacturing method is applied.

According to some exemplary embodiments of the present invention, there is provided a manufacturing method of an electrode assembly, the method including: blanking a first electrode from a first base including a first coated region and a first uncoated region; blanking a second electrode from a second base including a second coated region and a second uncoated region; laminating a separator on the second electrode; cutting the laminated second electrode with the separator; and stacking the laminated second electrode and the first electrode.

In an embodiment, the blanking of the second electrode includes: notching the second base such that some of the second base is connected; and cutting the notched second base to the second electrode before feeding the notched second base between the separator.

In an embodiment, the laminating of the separator includes continuously laminating two separators on opposite surfaces of the cut second electrode with a gap therebetween.

In an embodiment, the cutting of the laminated second electrode includes cutting the gap so that the cut separator protrudes out of the second electrode.

In an embodiment, the cutting of the laminated second electrode includes cutting the separator to correspond to an atypical shape of the second electrode when the second electrode is formed in the atypical shape.

In an embodiment, the blanking of the first electrode includes forming the first electrode in at least two sizes, and the blanking of the second electrode and the cutting of the laminated second electrode include forming the second electrode in a size corresponding to the first electrode.

According to some exemplary embodiments of the present invention, there is provided a manufacturing method of an electrode assembly, the method including: blanking a first electrode from a first base including a first coated region and a first uncoated region; laminating a separator on a second base including a second coated region and a second uncoated region; blanking a second electrode from the laminated second base; and stacking the blanked second electrode and the first electrode.

In an embodiment, the blanking of the second electrode includes blanking the second coated region and the separator to have a same size.

In an embodiment, the blanking of the first electrode includes taping an insulating member to a boundary of the first coated region and the first uncoated region.

In an embodiment, the stacking of the laminated second electrode includes forming the insulating member to correspond to the second coated region.

In an embodiment, the blanking of the first electrode includes forming the first electrode in at least two sizes, and the blanking of the second electrode includes forming the second electrode to be larger than the first electrode.

According to some exemplary embodiments of the present invention, there is provided an electrode assembly including: a first electrode including a first coated region and a first uncoated region; a second electrode including a second coated region and a second uncoated region; and a separator laminated on the second electrode and extending farther than the second electrode, wherein the first electrode, the second electrode, and the separator are stacked.

In an embodiment, the separator is laminated on each of opposite surfaces of the second electrode.

In an embodiment, the second electrode includes an atypical shape, and the separator is configured to extend farther than the second electrode corresponding to the atypical shape.

In an embodiment, the first electrode is formed in at least two sizes, and the second electrode has a size corresponding to the first electrode.

In an embodiment, the second electrode is at an outermost side of the electrode assembly.

In an embodiment, only an inner side of the second electrode includes a coated region.

In an embodiment, the separator is laminated on an outside of the second electrode.

According to some exemplary embodiments of the present invention, there is provided an electrode assembly including: a first electrode including a first coated region and a first uncoated region and to which an insulating member is taped at a boundary of the first coated region and the first uncoated region; a second electrode including a second coated region and a second uncoated region; and a separator laminated on the second electrode and having a same size as the second electrode, wherein the first electrode, the second electrode, and the separator are stacked.

In an embodiment, the insulating member corresponds to the second coated region.

In an embodiment, the first electrode is formed in at least two sizes, and the second electrode is formed to be larger than the first electrode.

According to some exemplary embodiments of the present invention, there is provided a rechargeable battery including: an electrode assembly including a first electrode including a first coated region and a first uncoated region, a second electrode including a second coated region and a second uncoated region, and a separator laminated on the second electrode and extending farther than the second electrode, the first and second electrodes and the separator being stacked; a first lead tab and a second lead tab connected to the first uncoated region and the second uncoated region; and a pouch configured to accommodate the electrode assembly, and from which the first lead tab and the second lead tab are drawn out.

In an embodiment, the second electrode includes an atypical shape, and the separator is configured to extend farther than the second electrode corresponding to the atypical shape.

In an embodiment, the first electrode is formed in at least two sizes, the second electrode has a size corresponding to the first electrode, the electrode assembly forms a plurality of steps, and the pouch is configured to accommodate the electrode assembly in a stepped state.

According to some exemplary embodiments of the present invention, there is provided a rechargeable battery including an electrode assembly including: a first electrode including a first coated region and a first uncoated region and to which an insulating member is taped at a boundary of the first coated region and the first uncoated region; a second electrode including a second coated region and a second uncoated region; and a separator laminated on the second electrode and having a same size as the second electrode, the first and second electrodes and the separator being stacked; a first lead tab and a second lead tab connected to the first uncoated region and the second uncoated region, respectively; and a pouch configured to accommodate the electrode assembly, and from which the first lead tab and the second lead tab are drawn out.

In an embodiment, the insulating member corresponds to the coated region of the second electrode.

In an embodiment, the first electrode is formed in at least two sizes, the second electrode is larger than the first electrode, the electrode assembly forms a plurality of steps, and the pouch is configured to accommodate the electrode assembly in a stepped state.

According to embodiments of the present invention, it is possible to manufacture an electrode assembly and a rechargeable battery that are applicable to variously sized and shaped accommodation spaces of electronic devices, by forming and cutting the second electrode (or the first electrode) and the first electrode (or the second electrode) on which the separators are respectively laminated in various sizes.

BRIEF DESCRIPTION OF THE DRAWINGS

The above and other features and aspects of the invention will be made more apparent by the following detailed description of exemplary embodiments thereof with reference to the attached drawings.

FIG. 5 illustrates a processing diagram of stacking the first electrode and the second electrode in the electrode assembly, following the processes of FIGS. 3 and 4.

DETAILED DESCRIPTION

Figure 1:
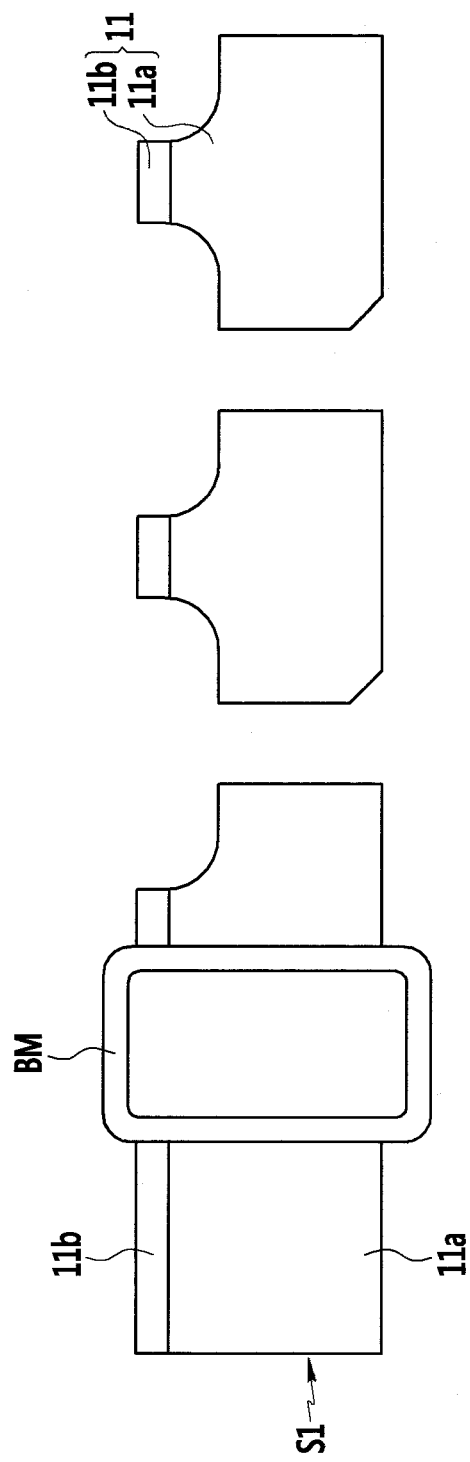
FIG. 1 illustrates a processing diagram of blanking a first electrode (e.g., a positive electrode) applied to a flexible electrode assembly according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
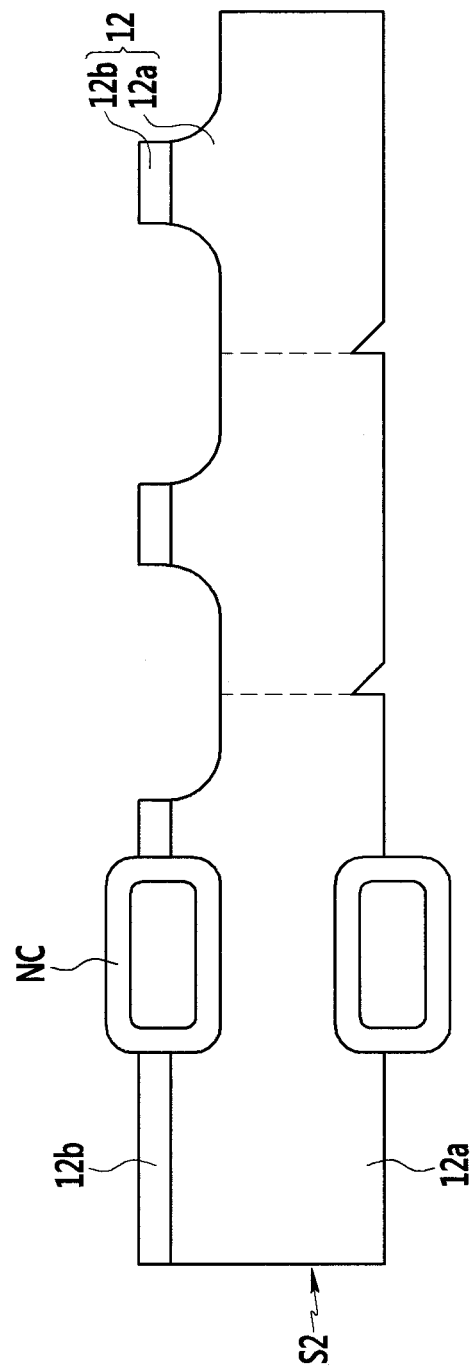
FIG. 2 illustrates a processing diagram of partially blanking a second electrode (e.g., a negative electrode) applied to a flexible electrode assembly according to a first exemplary embodiment of the present invention.
Figure 3:
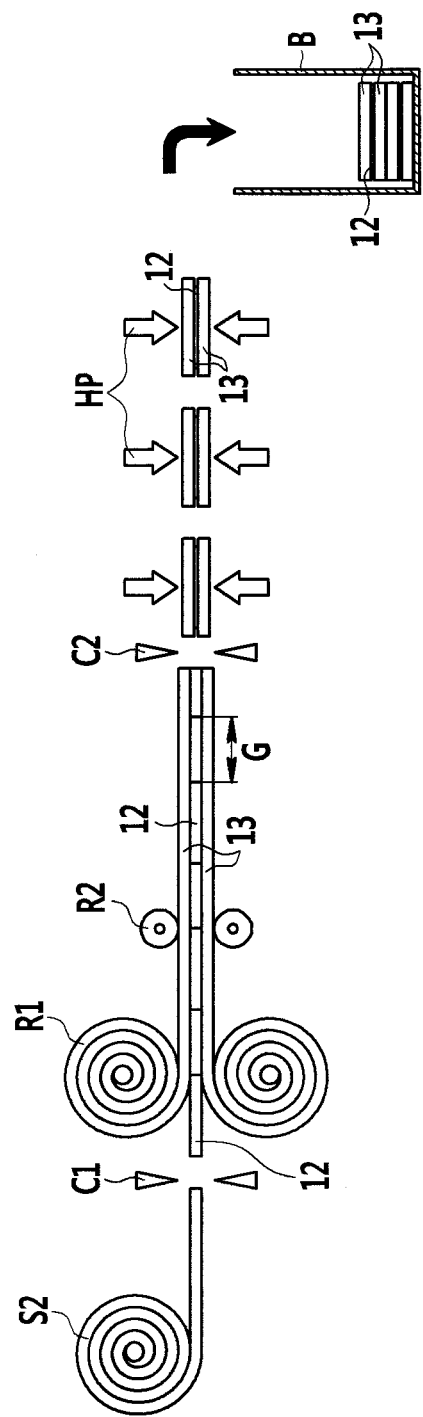
FIG. 3 illustrates a processing diagram of cutting the second electrode after laminating the separator on the second electrode, following the process of FIG. 2.
Figure 4:
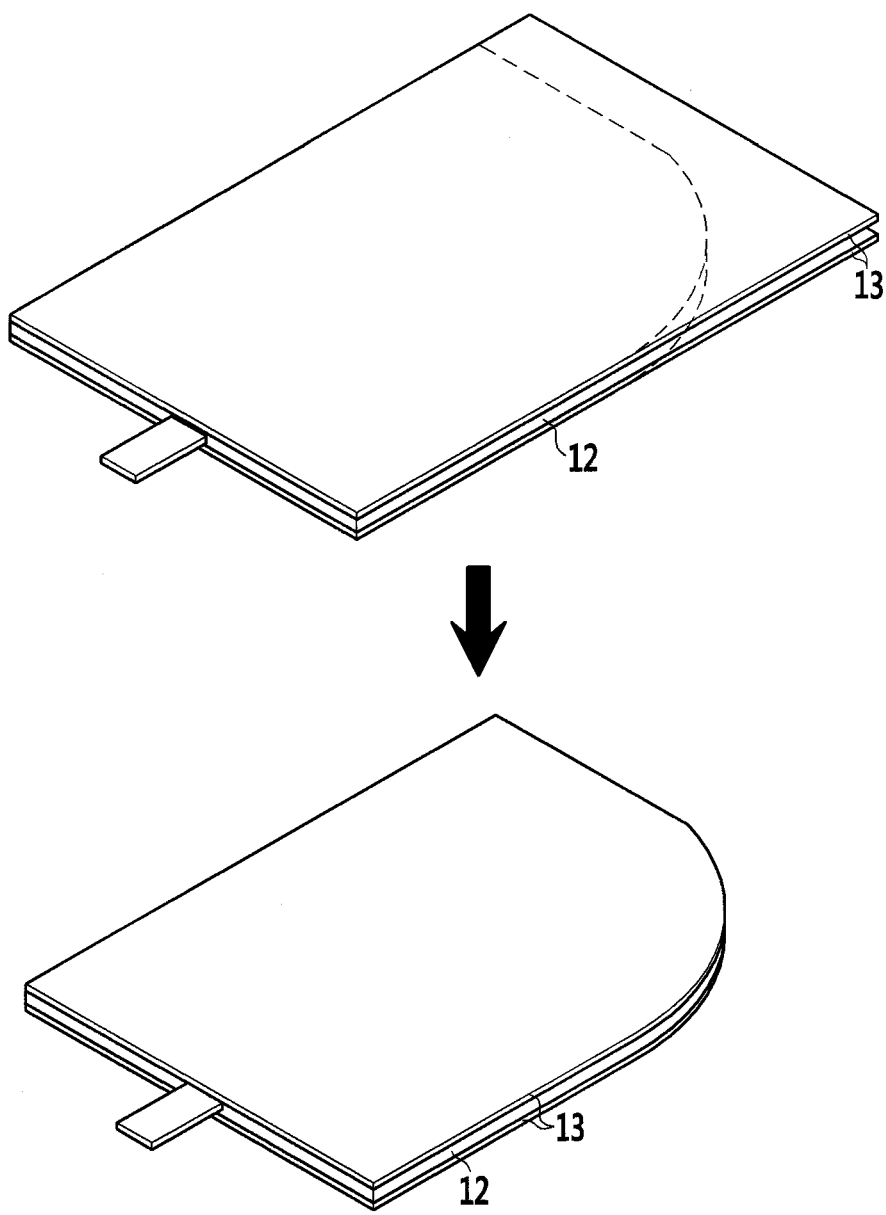
FIG. 4 illustrates a processing diagram of cutting the separator laminated along the second electrode, following the process of FIG. 3.
Figure 6:
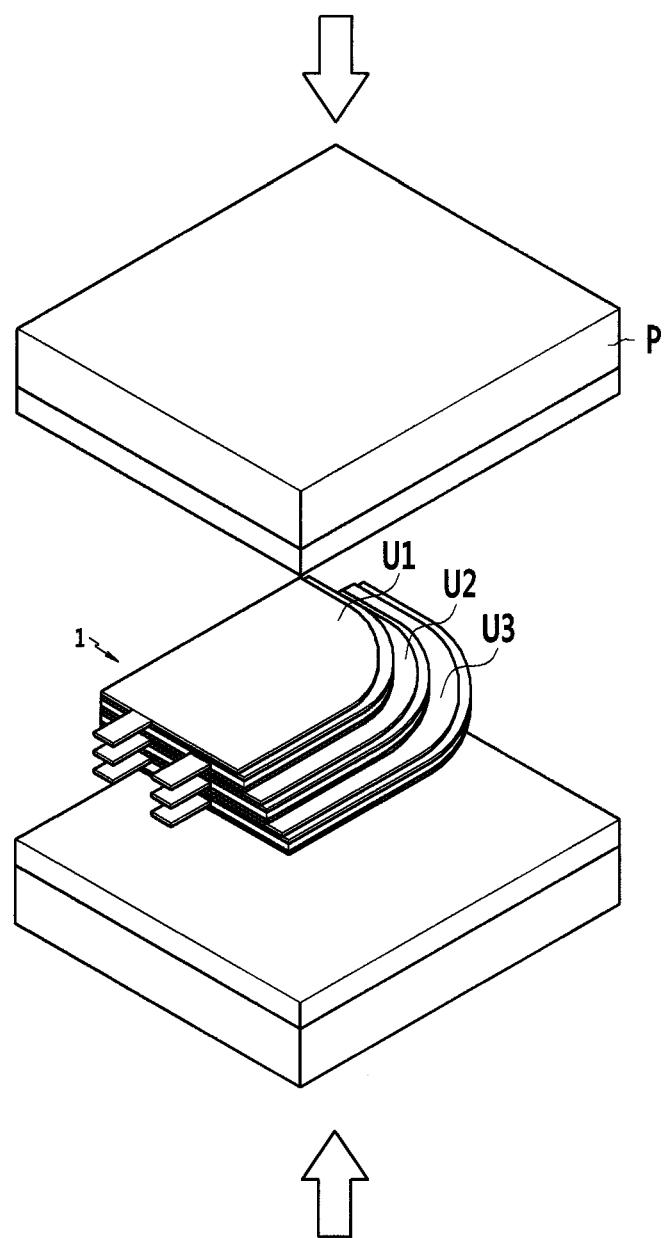
FIG. 6 illustrates a processing diagram of hot-pressing for completing the stacked electrode assembly, following the process of FIG. 5.

FIG. 1 illustrates a processing diagram of blanking (e.g., punching out) a first electrode (e.g., a positive electrode) applied to a flexible electrode assembly according to a first exemplary embodiment of the present invention. FIG. 2 illustrates a processing diagram of partially blanking a second electrode (e.g., a negative electrode) applied to a flexible electrode assembly according to the first exemplary embodiment of the present invention. FIG. 3 illustrates a processing diagram of cutting the second electrode after laminating the separator on the second electrode, following the process of FIG. 2. FIG. 4 illustrates a processing diagram of cutting the separator laminated along the second electrode, following the process of FIG. 3. FIG. 5 illustrates a processing diagram of stacking the first electrode and the second electrode in the electrode assembly, following the processes of FIGS. 3 and 4. FIG. 6 illustrates a processing diagram of hot-pressing for completing the stacked electrode assembly, following the process of FIG. 5.

Referring to FIGS. 1 to 6, a manufacturing method of a flexible electrode assembly 1 according to a first exemplary embodiment includes a first operation (e.g., refer to FIG. 1), a second operation (e.g., refer to FIGS. 2 and 3), a third operation (e.g., refer to FIGS. 3 and 4), and a fourth operation (e.g., refer to FIGS. 5 and 6). For better understanding and ease of description, it is assumed that a first electrode is a positive electrode and a second electrode is a negative electrode, and respective elements before and after blanking and cutting are referred to as using the same reference numerals.

Referring to FIG. 1, a first electrode (positive electrode) 11 is blanked (e.g., cut, or punched) from a first base S1 including a first coated region 11a and a first uncoated region 11b in the first operation. That is, the first electrode 11 is formed by blanking the first base S1 through a blanking mold (BM) in the first operation. In an example, the first electrode 11 and the first base S1 are made of aluminum (Al).

Because the first electrode 11 is blanked from the first base S1, the first base S1 may be formed so that the first coated region 11a thereof is formed to have a sequentially continued stripe type in a length direction or an intermittently formed pattern type in the length direction.

Referring to FIG. 2, a second electrode (negative electrode) 12 is blanked from a second base S2 including a second coated region 12a and a second uncoated region 12b in the second operation. That is, a second electrode 12 is formed by blanking the second base S2 in the second operation. For example, the second electrode 12 and the second base S2 may be made of copper (Cu).

Because the second electrode 12 is blanked from the second base S2, the second base S2 may be formed so that the second coated region 12a thereof is formed to have an intermittently formed pattern type in a length direction.

The second operation includes notching the second base S2, such that some parts of the second base S2 are connected to each other, by using a notching clipper (NC) (e.g., refer to FIG. 2), and cutting the second electrode 12 before feeding the notched second base S2 between separators 13. The separator 13 may be formed of a polymer film through which lithium ions pass.

That is, a cut position is set by partially blanking the second base S2 in the operation of notching. Referring to FIG. 3, in the operation of cutting, the notched second base S2 is cut by a first cutter C1, and the second electrode 12 is fed between feeding rolls R1 supplying the separator 13.

In the third operation, the separator 13 is laminated on the second electrode 12 by a pressing roll R2, and then cut by a second cutter C2. In the third operation, the cut second electrodes 12 are fed in a state in which they are separated from each other with a gap (G) therebetween, and then two separators 13 are continuously laminated on opposite surfaces of the fed second electrodes 12. That is, the second electrodes 12 are integrally connected by the separators 13.

In the third operation, the gap (G) between the cut second electrodes 12 is cut by the second cutter C2. Accordingly, because the separator 13 is protruded more to the outside than (e.g., extends further than) the second electrode 12, when being stacked, they electrically insulate the first and second electrodes 11 and 12. The second electrodes 12, on opposite surfaces of which the separators 13 are laminated, are processed by a hot press (HP). The processed second electrodes 12 are loaded into a cabinet (B). As such, because the separators 13 of the integrally connected state are laminated on the second electrodes 12 and then are cut, the separators 13 and the second electrodes 12 may be easily aligned while assembling.

Referring to FIG. 4, when the second electrode 12 is atypically formed (e.g., formed to have an unconventional shape) in the third operation, the separator 13 is cut corresponding to a shape that is atypically formed. In this case, the first electrode 11 is atypically formed in a manner corresponding to the second electrode 12 (e.g., cut in manner matching electrode 12). The first and second electrodes 11 and 12 may be formed in a quadrangle, a polygon, or a circle shape. As such, because the separators 13 of the integrally connected state are laminated on the second electrodes 12 and then are cut, even when the second electrode 12 is atypically formed, the separator 13 and the second electrode 12 may be easily aligned while assembling.

In the first operation, the first electrode 11 is formed in at least two sizes (e.g., refer to FIG. 1), and in the second and third operations, the second electrode 12 is formed by a size corresponding to (e.g., matching) the first electrode 11 (e.g., refer to FIG. 2). That is, the electrode assembly 1 is formed to be stepped by the first and second electrodes 11 and 12.

For example, the electrode assembly 1 is formed to be atypical (e.g., atypically shaped) and stepped. The electrode assembly 1 may also be atypically formed without a step, or may be typically formed with a step.

In the specification, the term "typical shape" refers to a triangle, a quadrangle, or a circle that are capable of forming an electrode assembly of a general cuboid or cylindrical shape, while the term "atypical shape" refers to those except for the "typical shape." Accordingly, the atypical shape may be formed to have a polygon or a shape in which a curved line and a straight line are connected, except for a quadrangle.

Referring to FIG. 5, the first electrode 11 may have three sizes that are categorized into a first small electrode 111, a first medium electrode 112, and a first large electrode 113. The second electrode 12, which is provided with the separators 13 on opposite surfaces thereof, is formed in three sizes that are categorized into a second small electrode 121, a second medium electrode 122, and a second large electrode 123, corresponding (e.g., in shape) to the first electrode 11.

The first small electrode 111 is stacked on the second small electrode 121 to form a first unit U1, the first medium electrode 112 is stacked on the second medium electrode 122 to form a second unit U2, and the first large electrode 113 is stacked on the second large electrode 123 to form a third unit U3. In addition, the first, second, and third units U1, U2, and U3 form an atypical electrode assembly 1 with steps.

Referring to FIGS. 5 and 6, the electrode assembly 1 is completed by stacking the second unit U2 on the third unit U3, and the first unit U1 on the second unit U2, and by then hot-pressing the stacked units by a press (P).

Because each of the first small, first medium, and first large electrodes 111, 112, and 113 is formed with a smaller area than each of the respective second small, second medium, and second large electrodes 121, 122, and 123, the first, second, and third units U1, U2, and U3 may be securely electrically insulated.

For better understanding and ease of description, in the first exemplary embodiment, the electrode assembly 1 includes each one of the first, second, and third units U1, U2, and U3. The electrode assembly may include a greater number of each of the first, second, and third units, or may include a number of the first, second, and third units that are different from each other, depending on a size and a shape of an inner space of an electronic device to which the electrode assembly 1 is applied.

Figure 7:
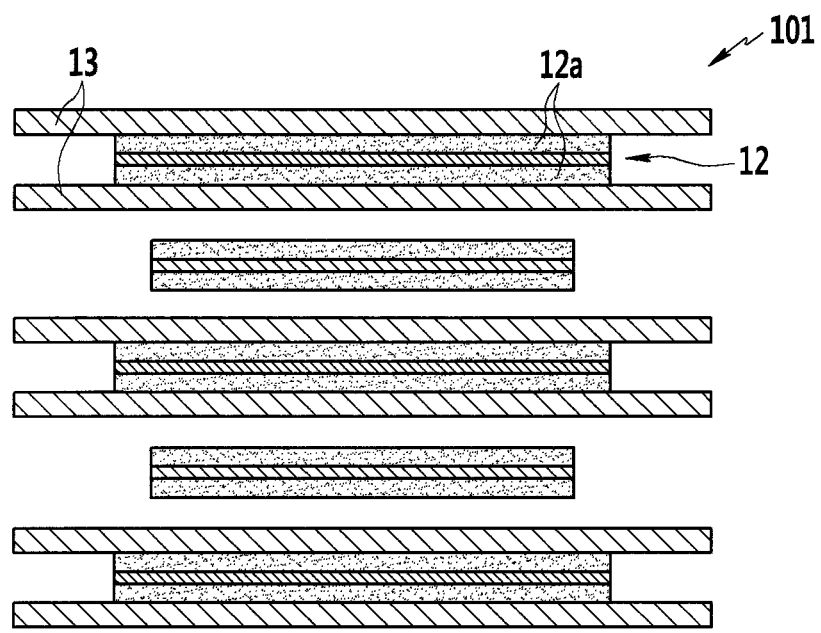
FIG. 7 illustrates a detailed view of laminating the separator on the second electrode (e.g., negative electrode) of a flexible electrode assembly according to a variation of the first exemplary embodiment of the present invention.

FIG. 7 illustrates a detailed view of laminating the separator on the second electrode (e.g., negative electrode) of a flexible electrode assembly according to a variation of the first exemplary embodiment of the present invention. The electrode assembly 1 of the first exemplary embodiment is stepped, and an electrode assembly 101 of an exemplary variation of the first exemplary embodiment is not stepped, but is flexible.

Referring to FIG. 7, in the electrode assembly 101 of the exemplary variation of the first exemplary embodiment, the second electrode 12 may be disposed at the outermost side thereof. When the second electrode 12 is a negative electrode, safety of the electrode assembly 101 can be further improved.

The second electrode 12 disposed at the outermost side of the electrode assembly is provided with the second coated regions 12a on the opposite surfaces thereof. The separator 13 is laminated on the outside of the outermost second electrode 12. The outer separator 13 may safely protect the second coated region 12a disposed at the outside of the second electrode 12.

A coated region may be formed inside the outermost second electrode 12 of the electrode assembly 101, and may not be formed outside it. In this case, it is possible to prevent a material of a coated region 12a from unnecessarily being wasted in the second electrode 12.

Hereinafter, various exemplary embodiments will be described. For better understanding and ease of description, the same configuration as the first exemplary embodiment and the above-described exemplary embodiments might not be repeated.

Figure 8:
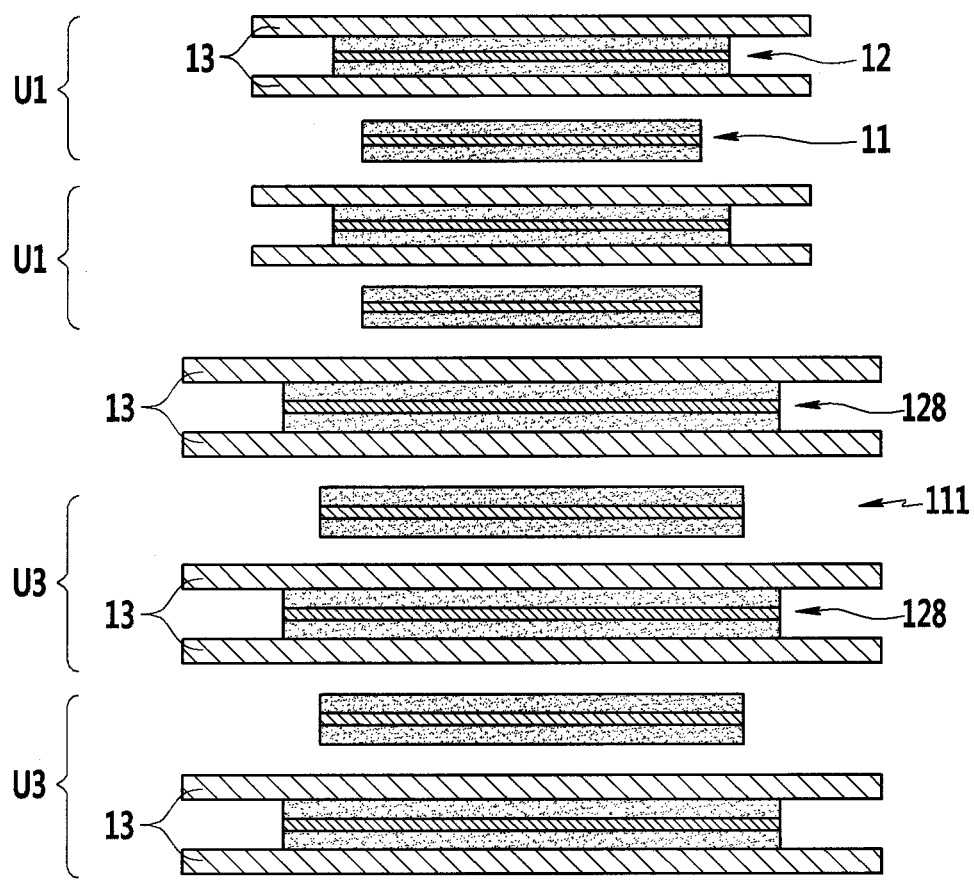
FIG. 8 illustrates a detailed view of laminating a separator on a second electrode (e.g., negative electrode) of a stepped electrode assembly according to a second exemplary embodiment of the present invention.

FIG. 8 illustrates a detailed view of laminating a separator on a second electrode (e.g., a negative electrode) of a stepped electrode assembly according to a second exemplary embodiment of the present invention. The electrode assembly 1 of the first exemplary embodiment uses each one of the first, second, and third units U1, U2, and U3, while an electrode assembly 2 of the second exemplary embodiment uses two first units U1 and two third units U3, and further includes a second electrode 128 on which the separator 13 of the third unit U3 is laminated. Further, the electrode assemblies 1 and 2 of the first and second exemplary embodiments are atypical, are formed to be stepped, and are flexible.

Figure 9:
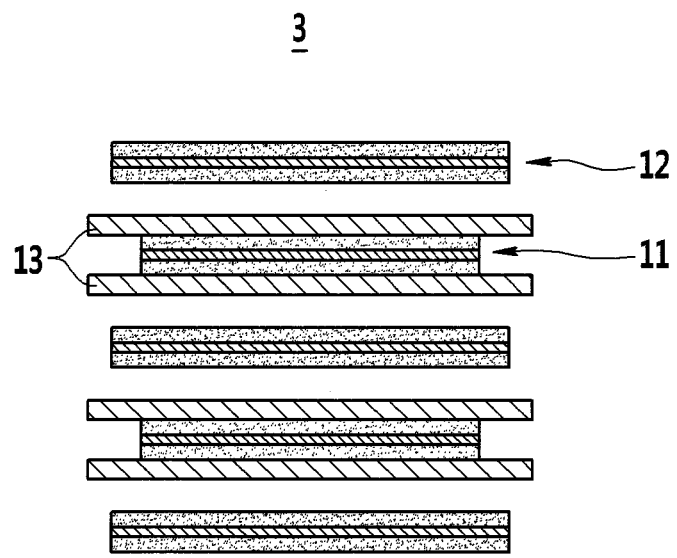
FIG. 9 illustrates a detailed view of laminating a separator on a first electrode (e.g., positive electrode) of a flexible electrode assembly according to a third exemplary embodiment of the present invention.

FIG. 9 illustrates a detailed view of laminating a separator on a first electrode (e.g., positive electrode) of a flexible electrode assembly according to a third exemplary embodiment of the present invention. The electrode assembly 101 of the exemplary variation of the first exemplary embodiment is formed by laminating the separator 13 on the second electrode (negative electrode) 12, while an electrode assembly 3 of the third exemplary embodiment is formed by laminating the separator 13 on the first electrode (positive electrode) 11.

Referring to FIG. 9, the second electrode 12 disposed at the outermost side of the electrode assembly is provided with the second coated regions 12a on the opposite surfaces thereof. A coated region may be formed inside the outermost second electrode 12 of the electrode assembly 3, and may not be formed outside it. In this case, it is possible to prevent or substantially prevent a material of a coated region 12a from unnecessarily being wasted in the second electrode 12.

Figure 10:
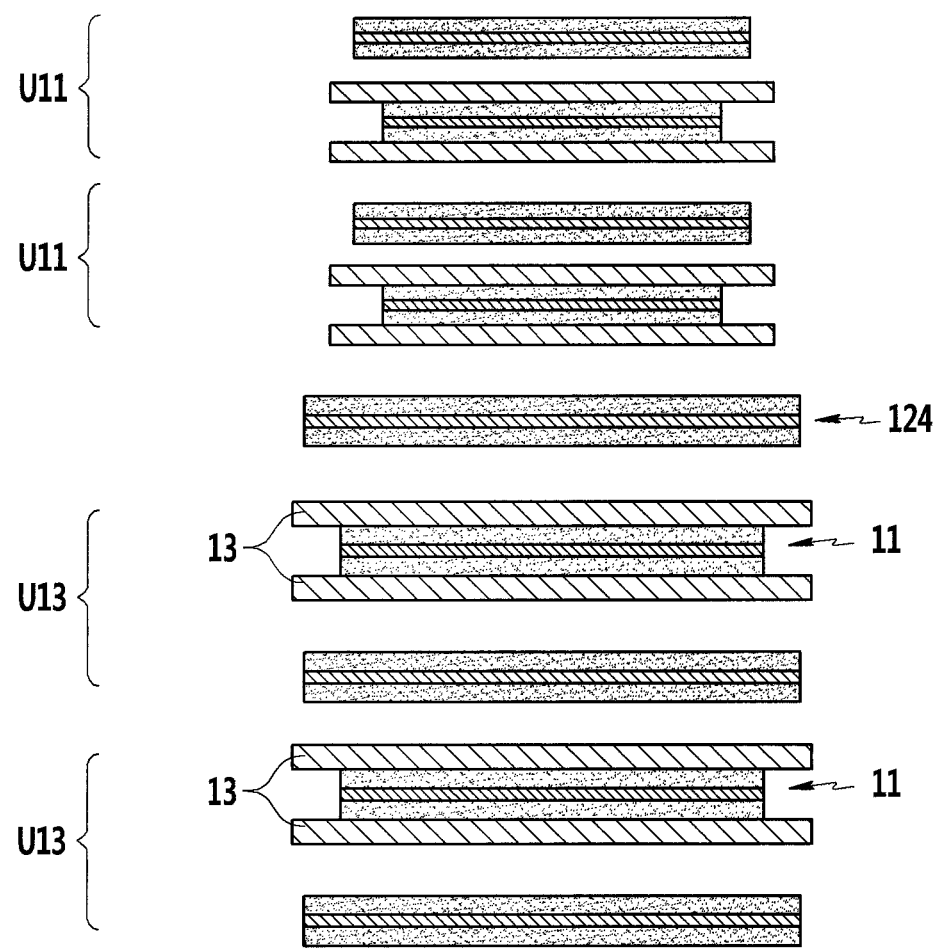
FIG. 10 illustrates a detailed view of laminating a separator on a second electrode (e.g., positive electrode) of a stepped electrode assembly according to a fourth exemplary embodiment of the present invention.

FIG. 10 illustrates a detailed view of laminating a separator on a second electrode (e.g., positive electrode) of a stepped electrode assembly according to a fourth exemplary embodiment of the present invention. The electrode assembly 1 of the first exemplary embodiment uses each one of the first, second, and third units U1, U2, and U3, while an electrode assembly 4 of the fourth exemplary embodiment uses two first units U11 and two third units U13, and further includes a second electrode 124 of the third unit U13. Further, the electrode assemblies 1 and 4 of the first and fourth exemplary embodiments are atypical, are formed to be stepped, and are flexible.

Figure 11:
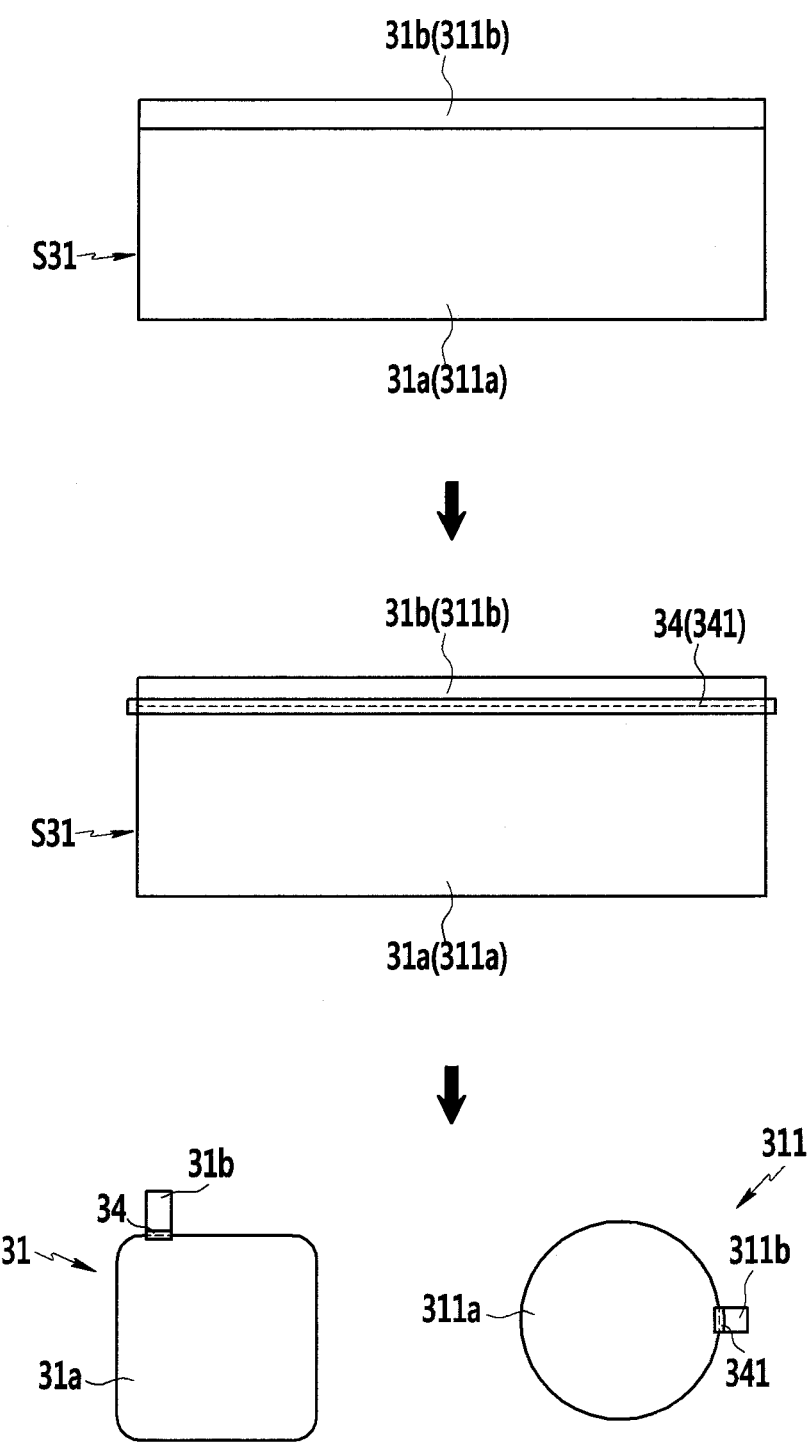
FIG. 11 illustrates a processing diagram of blanking a first electrode, after taping an insulating member to the first electrode (positive electrode) applied to a flexible electrode assembly according to a fifth exemplary embodiment of the present invention.
Figure 12:
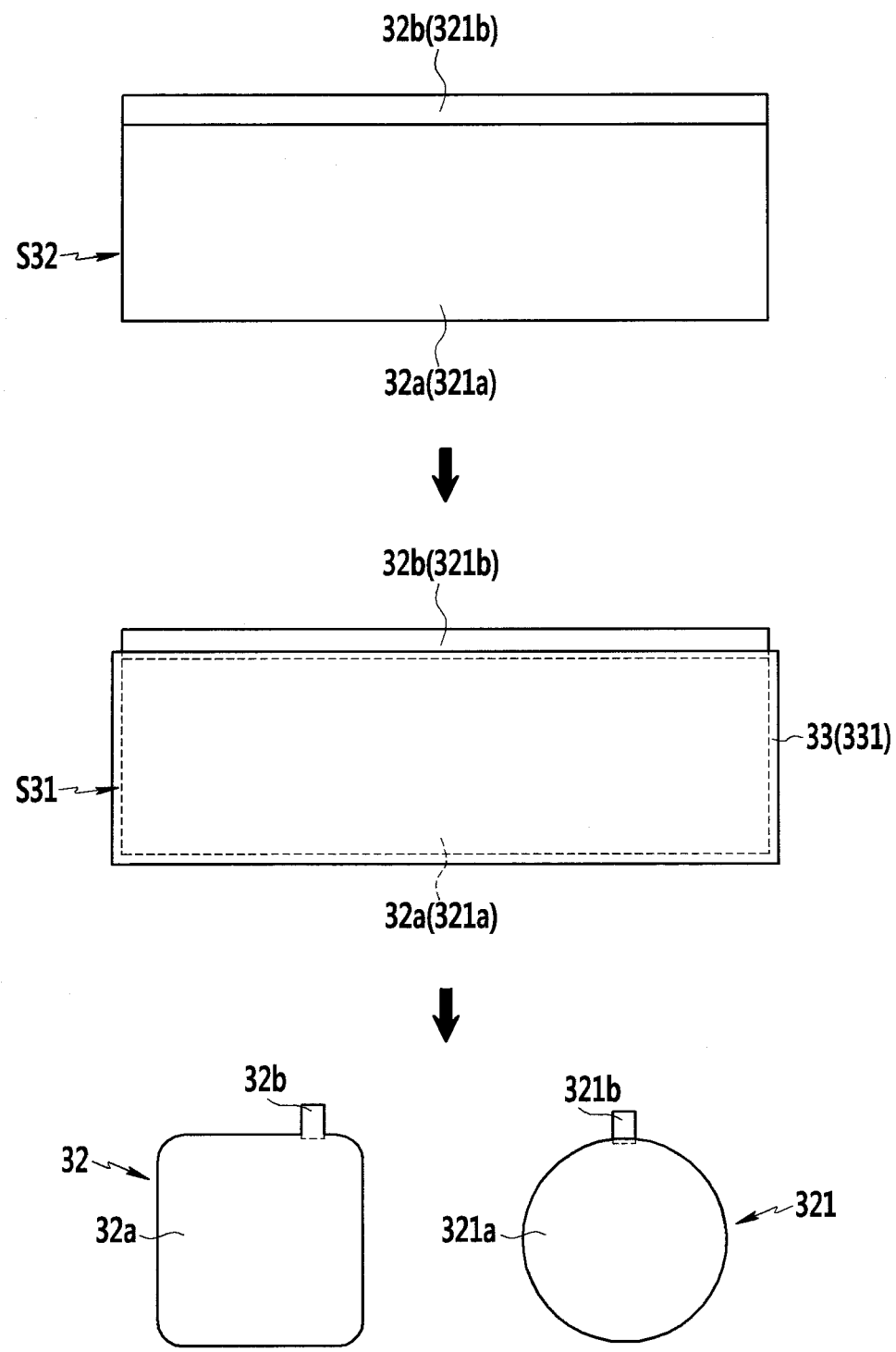
FIG. 12 illustrates a processing diagram of cutting a second electrode after laminating a separator on the second electrode (negative electrode) applied to a flexible electrode assembly according to a fifth exemplary embodiment of the present invention.
Figure 13:
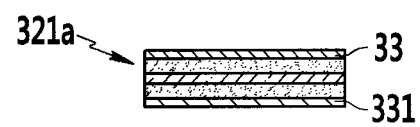
FIG. 13 illustrates a cross-sectional view of cutting the second electrode of FIG. 12.
Figure 14:
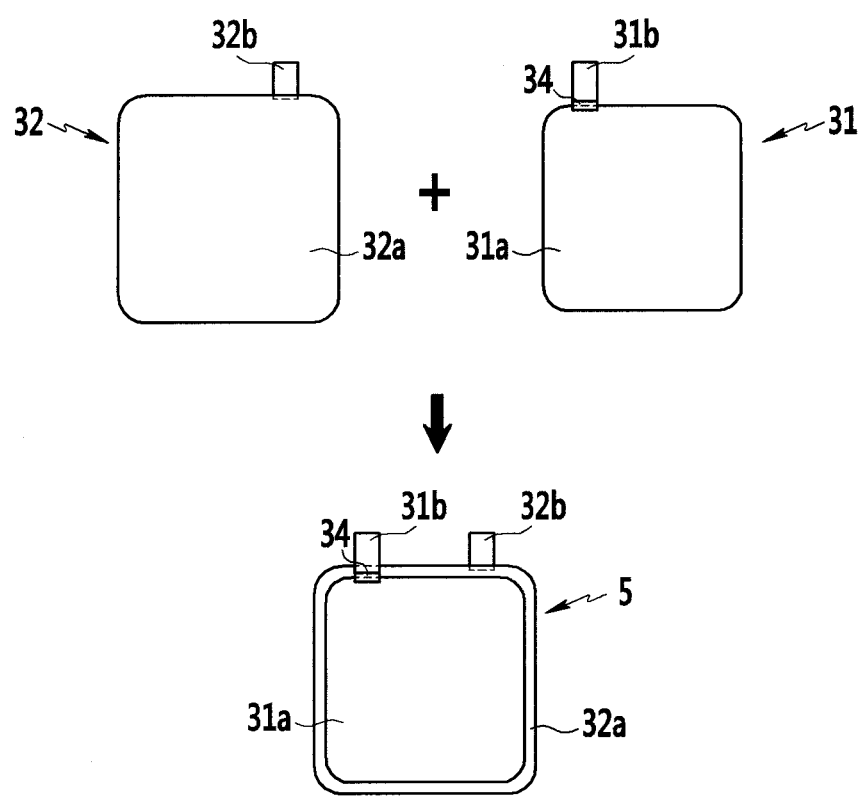
FIG. 14 illustrates a processing diagram of stacking the first electrode and the second electrode in the flexible electrode assembly, following the processes of FIGS. 11 and 12.
Figure 15:
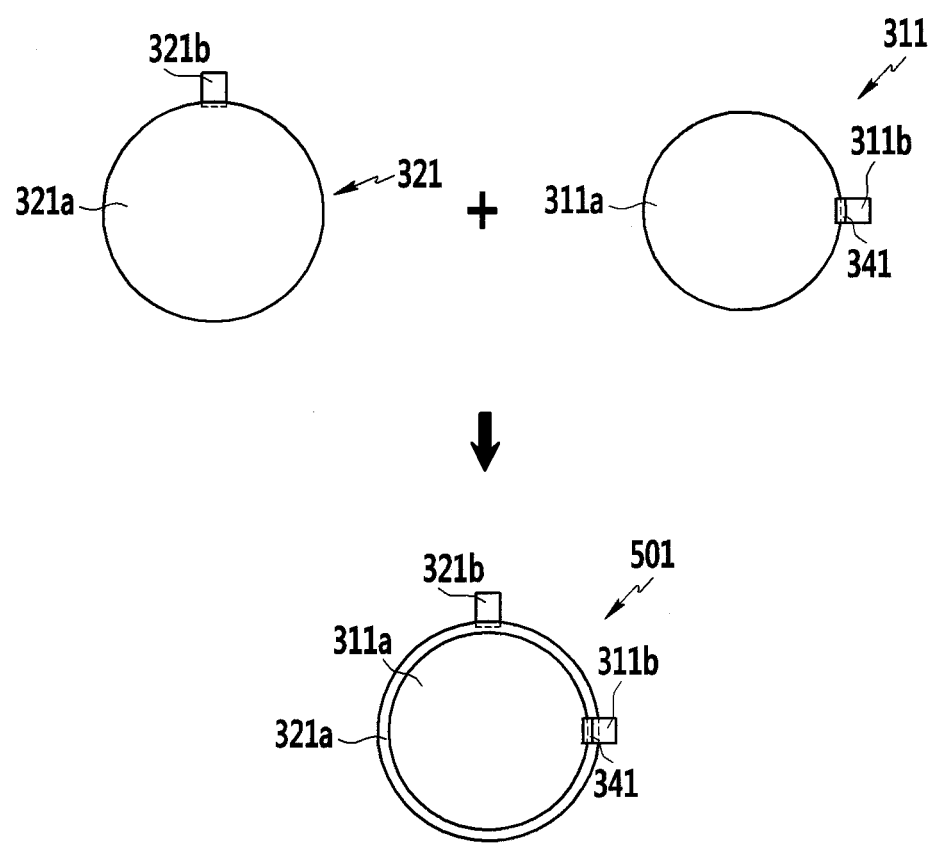
FIG. 15 illustrates a processing diagram of stacking the first electrode and the second electrode in the flexible electrode assembly, following the processes of FIGS. 11 and 12.

FIG. 11 illustrates a processing diagram of blanking a first electrode, after taping an insulating member to the first electrode (positive electrode) applied to a flexible electrode assembly according to a fifth exemplary embodiment of the present invention. FIG. 12 illustrates a processing diagram of cutting a second electrode after laminating a separator on the second electrode (negative electrode) applied to a flexible electrode assembly according to a fifth exemplary embodiment. FIG. 13 illustrates a cross-sectional view of cutting the second electrode of FIG. 12. FIG. 14 illustrates a processing diagram of stacking the first electrode and the second electrode in the flexible electrode assembly, following the processes of FIGS. 11 and 12. FIG. 15 illustrates a processing diagram of stacking the first electrode and the second electrode in the flexible electrode assembly, following the processes of FIGS. 11 and 12.

Referring to FIGS. 11 to 15, a manufacturing method of flexible electrode assemblies (5 and 501) according to a fifth exemplary embodiment includes a first operation (e.g., refer to FIG. 11), a second operation (e.g., refer to FIG. 12), a third operation (e.g., refer to FIGS. 12 and 13), and a fourth operation (e.g., refer to FIGS. 14 and 15).

Referring to FIG. 11, a first electrode (positive electrode) (31 or 311) is blanked from a first base S31 including a first coated region (31a or 311a) and a first uncoated region (31b or 311b) in the first operation. For example, in the first operation, the first electrode (31 or 311) is formed by blanking the first base S31.

The first operation further includes taping an insulating member (34 or 341) to a boundary of the first coated region (31a or 311a) and the first uncoated region (31b or 311b) in the first electrode (31 or 311). Accordingly, the blanked first electrode (31 or 311) is provided with the insulating member (34 or 341) on the boundary of the first coated region (31a or 311a) and the first uncoated region (31b or 311b). The first electrode (31 or 311) may be formed in a quadrangular or circular shape.

Referring to FIGS. 12 and 13, a separator (33 or 331) is laminated on each of opposite surfaces of a second base S32, which is provided with a second coated region (32a or 321a) and a second uncoated region (32b or 321 b) in the second operation. In the third operation, the second electrode (negative electrode) (32 or 321) is blanked from the laminated second base S32.

For example, in the third operation, the second electrode (32 or 321) is formed by blanking the second base S32. Accordingly, in the third operation, the second coated region (32a or 321a) and the separator (33 or 331) are blanked with the same size in the second electrode (32 or 321). The second electrode (32 or 321) may be formed in a quadrangular or circular shape corresponding to the first electrode (31 or 311).

FIG. 14 illustrates a processing diagram of stacking the first electrode and the second electrode in the flexible electrode assembly, following the processes of FIGS. 11 and 12. Referring to FIG. 14, an electrode assembly 5 is formed by stacking the respective blanked quadrangular second and first electrodes 32 and 31 in the fourth operation. In the fourth operation, the first electrode 31 and the second electrode 32 are electrically insulated by forming the insulating member 34 attached to the first electrode 31 to correspond to the second coated region 32a of the second electrode 32.

FIG. 15 illustrates a processing diagram of stacking the first electrode and the second electrode in the flexible electrode assembly, following the processes of FIGS. 11 and 12. Referring to FIG. 15, an electrode assembly 501 is formed by stacking the respective blanked circular second and first electrodes 321 and 311 in the fourth operation. In the fourth operation, the first electrode 311 and the second electrode 321 are electrically insulated by forming the insulating member 341 attached to the first electrode 311 to correspond to the second coated region 321a of the second electrode 321.

Referring to FIGS. 14 and 15, the first electrode (31 or 311) and the second electrode (32 or 321) may be formed to have a single size. The first electrode and the second electrode may be formed to have at least two sizes. For better understanding and ease of description, because the separator (33 or 331) provided at the second electrode (32 or 321) is blanked to have the same size as the second coated region (32a or 321a), a detailed description thereof may not be repeated.

The first electrode (31 or 311) is formed in the first operation, and the second electrode (32 or 321) is formed in a larger area than the first electrode (31 or 311) corresponding to the first electrode (31 or 311) in the second operation. For example, the first electrode (31 or 311) is formed relatively small, and the second electrode (32 or 321) is formed relatively large, and the insulating member (34 or 341) provided at the first electrode (31 or 311) electrically insulates the first electrode (31 or 311) from the second coated region (32a or 321a) of the second electrode (32 or 321).

Figure 16:
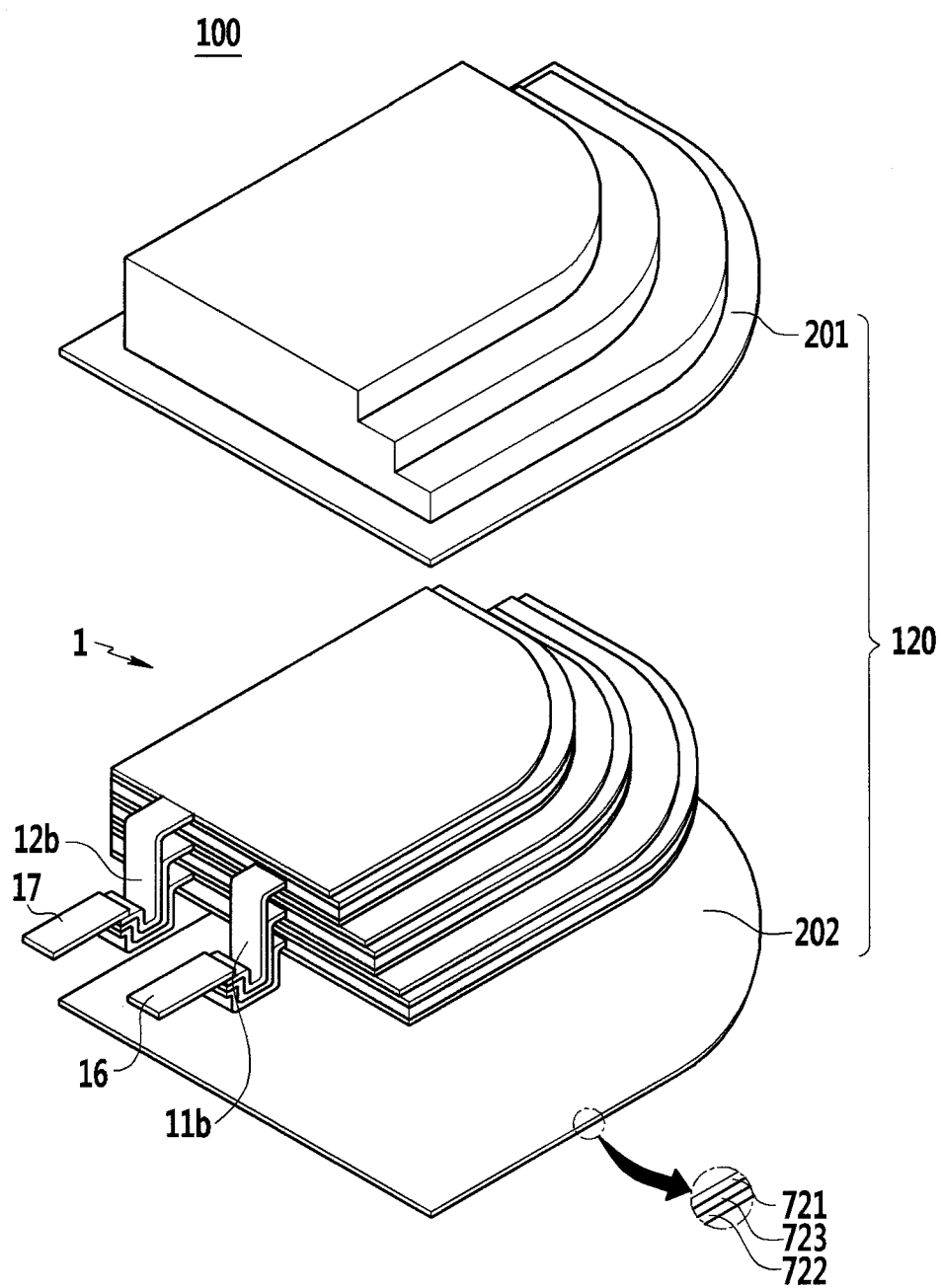
FIG. 16 illustrates an exploded perspective view of a rechargeable battery according to an exemplary embodiment of the present invention.
Figure 17:
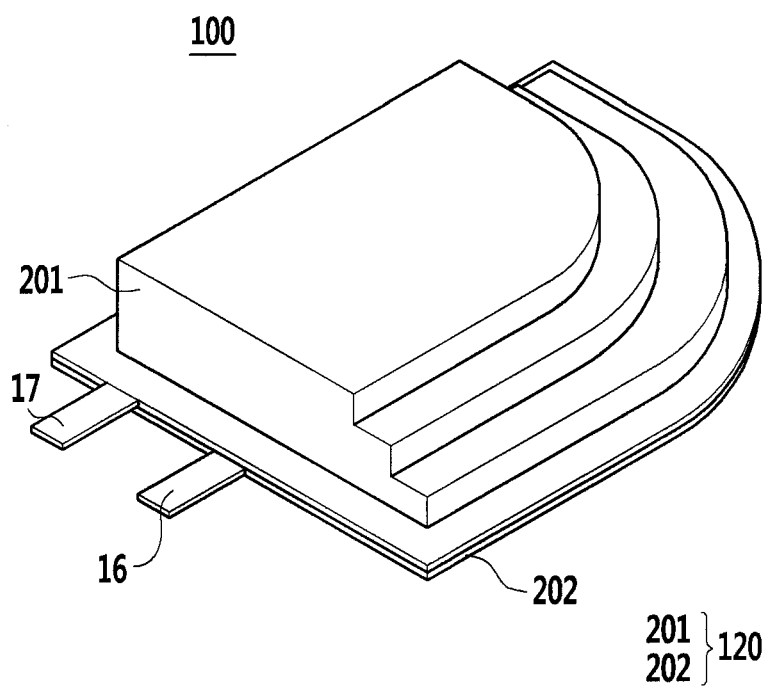
FIG. 17 illustrates a perspective view of a state in which the rechargeable battery of FIG. 16 is assembled.

FIG. 16 illustrates an exploded perspective view of a rechargeable battery according to an exemplary embodiment of the present invention. FIG. 17 illustrates a perspective view of a state in which the rechargeable battery of FIG. 16 is assembled. For better understanding and ease of description, a rechargeable battery 100 to which the electrode assembly 1 of the first exemplary embodiment is applied will be described.

Referring to FIGS. 16 and 17, a rechargeable battery 100 according to an exemplary embodiment includes the electrode assembly 1, in and from which a current is charged and discharged, a first lead tab 16 and a second lead tab 17 respectively connected to the first uncoated region 11b and the second uncoated region 12b, and a case 120 (e.g., referred to as a pouch below) that accommodates the electrode assembly 1, draws the first and second lead tabs 16 and 17 outside, and is flexible.

The second electrode 12 is formed in an atypical shape, and the separator 13 protrudes outward from the second electrode 12 corresponding to the atypical shape (e.g., refer to the first exemplary embodiment). The electrode assembly 1 is formed to have three steps, and the pouch 120 is formed to accommodate the stepped electrode assembly 1.

In addition, the rechargeable battery to which the electrode assembly 5 of the fifth exemplary embodiment (e.g., refer to FIG. 14) is applied may be described. In the electrode assembly 5, the first electrode 31 is provided with the first coated region 31a and the first uncoated region 31b, and the taped insulating member 34 is provided on the boundary of the first coated region 31a and the first uncoated region 31b. The separator is laminated in the same area as the second electrode 32. The insulating member 34 provided at the first electrode 31 electrically insulates the first electrode 31 from the second coated region 32a of the second electrode 32. When the electrode assembly is formed to have a plurality of steps, the pouch accommodates the electrode assembly 5, which has multiple steps.

Referring back to the electrode assembly 1 of the first exemplary embodiment, the first and second uncoated regions 11b and 12b are alternately arranged in a width direction in the first and second electrodes 11 and 12 that are stacked. For example, in FIG. 16, the first uncoated regions 11b of the first electrode 11 are disposed and stacked to the right, and the second uncoated regions 12b of the second electrode 12 are disposed and stacked to the left.

The first and second lead tabs 16 and 17 are connected to first and second uncoated region 11b and 12b of the first and second electrodes 11 and 12 by welding. The pouch 120 is flexible, and accommodates the electrode assembly 1, with its exterior part thermo-bonded to form the rechargeable battery. For example, the pouch 120 may include first cladding 201 and second cladding 202 on the opposite surfaces of the electrode assembly 1.

When the exterior parts of the first and second cladding 201 and 202 are thermo-bonded and sealed, the first and second lead tabs 16 and 17 are electrically insulated from each other, and are drawn out of the pouch 120. For example, the pouch 120 includes an inner sheet 721, an outer sheet 722, and a metal sheet 723 therebetween.

The inner sheet 721 forms an inner surface of the pouch 120 and is insulated and thermo-bonded, and may be formed of a polymer sheet. The outer sheet 722 forms an outer surface of the pouch 120 and performs a protective operation, and may be formed of a polyethylene terephthalate (PET) sheet, a nylon sheet, or a PET-nylon composite sheet. The metal sheet 723 is provided between the inner and outer sheets 721 and 722, and provides mechanical strength to the pouch 120. For example, the metal sheet 723 may be formed of an aluminum sheet.

The first and second claddings 201 and 202 may be formed as the inner sheet 721, the outer sheet 722, and the metal sheet 723 that have the same layered structure. The pouch includes a gasket and may receive the electrode assembly by bonding the first and second claddings to the gasket.

For example, the first cladding 201 has a concave structure with a step to receive the electrode assembly 1 having a stepped structure, and the second cladding 202 is flat to cover the electrode assembly 3 that is received in the first cladding. The second cladding may be connected to the first cladding at one side thereof.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SOME OF THE REFERENCE CHARACTERS

| | |
|---|---|
| 1, 2, 3, 4, 5, 101, 501: electrode assembly | |
| 11, 31, 311: first electrode (positive electrode) | |
| 11a, 31a or 311a: first coated region | |
| 11b, 31b, 311b: first uncoated region | |
| 12, 124, 128, 32, 321: second electrode (negative electrode) | |
| 12a, 32a, 321a: second coated region | |
| 12b, 32b, 321b: second uncoated region | 13, 33, 331: separator |
| 16, 17: first and second lead tab | 34, 341: insulating member |
| 100: rechargeable battery | |
| 111, 112, 113: first small, medium, large electrode | |
| 121, 122, 123: second small, medium, large electrode | |
| 120: case (pouch) | |
| 201, 202: first and second cladding | 721: inner sheet |
| 722: outer sheet | 723: metal sheet |
| B: cabinet | BM: blanking mold |
| C1, C2: first and second cutter | G: gap |
| HP: hot press | NC: notching clipper |
| P: press | R1: feeding roll |
| R2: pressing roll | S1, S31: first base |
| S2, S32: second base | U1, U11: first unit |
| U2, U12: second unit | U3, U13: third unit |

What is claimed is:

1. A manufacturing method of an electrode assembly, the method comprising:
   blanking a first electrode from a first base comprising a first coated region and a first uncoated region;
   blanking a second electrode from a second base comprising a second coated region and a second uncoated region, the second base having a stacked structure with opposite portions of the second coated region being separated by, and at opposite sides of, the second base, and the second uncoated region extending out from between the opposite portions of the second coated region along an extension direction of second base;

laminating a separator on the second electrode;
cutting the laminated second electrode with the separator; and
stacking the laminated second electrode and the first electrode.

2. The manufacturing method of the electrode assembly of claim 1,
wherein the separator comprises two separators, and
wherein the blanking of the second electrode comprises:
notching the second base such that some of the second base is connected; and
cutting the notched second base to the second electrode before feeding the notched second base between the two separators.

3. The manufacturing method of the electrode assembly of claim 2, wherein the laminating of the separator comprises continuously laminating the two separators on opposite surfaces of the cut second electrode with a gap therebetween.

4. The manufacturing method of the electrode assembly of claim 3, wherein the cutting of the laminated second electrode comprises cutting the gap so that the cut separator protrudes out of the second electrode.

5. The manufacturing method of the electrode assembly of claim 3, wherein the cutting of the laminated second electrode comprises cutting the separator to correspond to a matching shape of the second electrode when the second electrode is formed in a curved shape.

6. The manufacturing method of the electrode assembly of claim 5,
wherein the blanking of the first electrode comprises forming the first electrode in at least two sizes, and
wherein the blanking of the second electrode and the cutting of the laminated second electrode comprise forming the second electrode in a size corresponding to the first electrode.

7. A manufacturing method of an electrode assembly, the method comprising:
cutting a first electrode from a first base comprising a first coated region and a first uncoated region;
laminating a separator on a second base comprising a second coated region and a second uncoated region, the second base having a stacked structure with opposite portions of the second coated region being separated by, and at opposite sides of, the second base, and the second uncoated region extending out from between the opposite portions of the second coated region along an extension direction of second base;
cutting a second electrode from the laminated second base; and
stacking the cut second electrode and the first electrode.

8. The manufacturing method of the electrode assembly of claim 7, wherein the cutting blanking of the second electrode comprises cutting the second coated region and the separator to have a same size.

9. The manufacturing method of the electrode assembly of claim 7, wherein the cutting of the first electrode comprises taping an insulating member to a boundary of the first coated region and the first uncoated region.

10. The manufacturing method of the electrode assembly of claim 9, wherein the stacking of the laminated second electrode comprises forming the insulating member to correspond to the second coated region.

11. The manufacturing method of the electrode assembly of claim 7,
wherein the cutting of the first electrode comprises forming the first electrode in at least two sizes, and
wherein the cutting of the second electrode comprises forming the second electrode to be larger than the first electrode.

* * * * *

UNITED STATES PATENT AND TRADEMARK OFFICE
CERTIFICATE OF CORRECTION

PATENT NO. : 10,355,303 B2
APPLICATION NO. : 15/227841
DATED : July 16, 2019
INVENTOR(S) : Bo-Hyun Kim et al.

Page 1 of 1

It is certified that error appears in the above-identified patent and that said Letters Patent is hereby corrected as shown below:

In the Claims

Column 14, Line 17, Claim 8     after "cutting", delete "blanking"

Signed and Sealed this
Second Day of June, 2020

Andrei Iancu
*Director of the United States Patent and Trademark Office*